(No Model.)
C. H. JOOSTEN.
INSECT POWDER DISTRIBUTER.
No. 487,122. Patented Nov. 29, 1892.
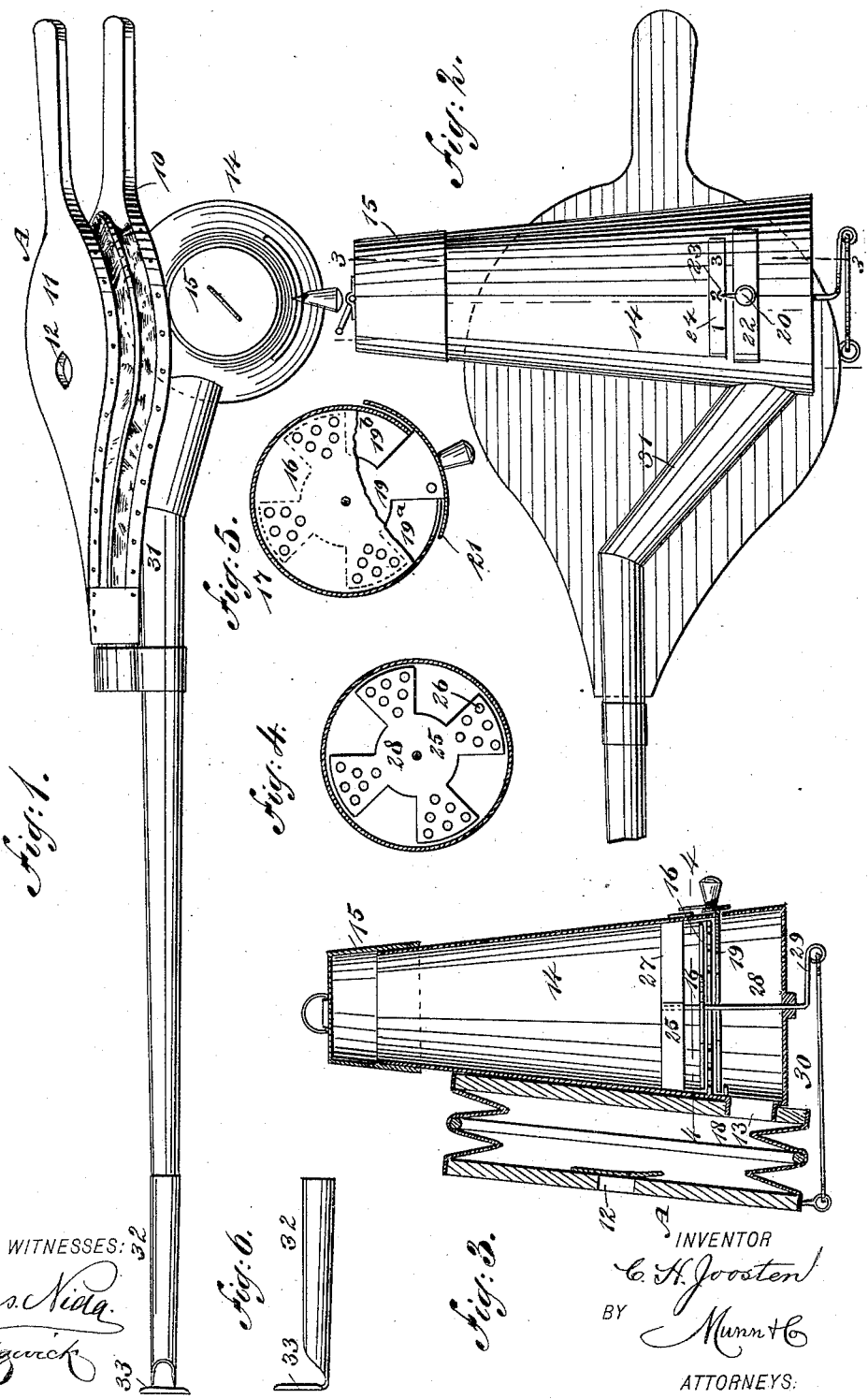

UNITED STATES PATENT OFFICE.

CHRISTIAN H. JOOSTEN, OF NEW YORK, N. Y.

INSECT-POWDER DISTRIBUTER.

SPECIFICATION forming part of Letters Patent No. 487,122, dated November 29, 1892.

Application filed August 2, 1892. Serial No. 441,910. (No model.)

*To all whom it may concern:*

Be it known that I, CHRISTIAN H. JOOSTEN, of New York city, in the county and State of New York, have invented a new and Improved Device for Distributing Fungus and Insecticide Powder, of which the following is a full, clear, and exact description.

My invention relates to a device especially adapted for distributing fungus and insecticide powder upon plants, and has for its object to provide a portable or hand device exceedingly simple, light, and durable in its construction and under the perfect control of the operator, whereby the powder contained in the device may be blown upon the plants in such a manner as to effectively reach the parts to be operated upon.

The invention consists in the novel construction and combination of the several parts, as will be hereinafter fully set forth, and pointed out in the claim.

Reference is to be had to the accompanying drawings, forming a part of this specification, in which similar figures and letters of reference indicate corresponding parts in all the views.

Figure 1 is a perspective view of the device. Fig. 2 is a side elevation thereof. Fig. 3 is a section taken practically on the line 3 3 of Fig. 2. Fig. 4 is a transverse section taken through the powder-receptacle forward of the line 4 4 of Fig. 3 and looking upward. Fig. 5 is a section taken on the same line, but looking downward, a portion of the plate or stationary partition in the receptacle being broken away; and Fig. 6 is a detail view of the deflecting-nozzle for the device.

In carrying out the invention one portion of the device consists of a bellows A. One side board 10 of the bellows is stationary, while the other side board 11 is adapted to be moved to and from the stationary one, the movable board being provided with a valve-opening 12 to admit air and the stationary board with an exit-opening 13, as the bellows is not provided at its forward end with a nozzle, as is customary. Upon the stationary side of the bellows a receptacle 14 is secured, adapted to contain the powder to be distributed upon plants. This receptacle extends transversely across the fixed board of the bellows, as shown in both Figs. 2 and 3, and although the receptacle may be of any desired shape it is preferably made somewhat tapering, being widest at its bottom, and the receptacle is provided with an opening at one side near its bottom, the opening in the receptacle registering with the outlet-opening in the bellows, whereby the air forced from the bellows is forced into the lower portion of the powder-receptacle. The powder-receptacle is provided with a removable top 15, in order that the interior thereof may be viewed and powder may be placed therein, and the cover 15 is preferably made to screw upon the body. Above the opening in the receptacle leading into the bellows a stationary or fixed transverse partition 16 is located. This partition 16 is shown in Fig. 5, and is shown as provided at intervals with a series of circularly-arranged openings 17, the openings being arranged in groups, as shown in said Fig. 5, and immediately beneath the partition 16 annular slideways 18 are produced upon the inner wall of the receptacle 14, as shown in Fig. 3, and in these slideways a damper 19 is held to revolve, the said damper comprising a central hub $19^a$ and a series of wings $19^b$, which wings correspond in number and shape to the groupings of apertures in the partition, so that by revolving the damper or slide 19 its wings may be carried from beneath the groupings of apertures in the partition and permit powder to pass down through the said apertures into the bottom portion of the receptacle, or the amount of powder thus delivered to the bottom of the receptacle may be regulated by causing the wings of the slide or damper to partially close the groupings of apertures, or the entire supply may be cut off by causing the wings $19^b$ of the slide or damper to completely close all the apertures in the partition. The slide is operated to produce the above-named results by means of a knob or handle 20, secured to one of the wings, which wing has guided movement in a transverse or circumferential slot 21, formed in the outer side face of the receptacle, and the powder is prevented from escaping through this slot by means of a shield 22, connected with an outwardly-extending and knob-carrying wing, as shown in Figs. 2 and 5. The knob 20 carries a pointer 23, and this pointer as the slide is moved travels over a scale 24, formed upon the exterior of the receptacle and numbered, for example, "1," "2," "3," in which event the scale is intended to read in thirds. Thus if the pointer is at "1" it will serve to indicate that the damper or slide has been turned in a manner to shut off one-third of the supply of powder to the bottom of the receptacle. When the pointer indicates "2," two-thirds of the openings will be closed, while when the pointer reaches "3" it indicates that all of the openings have been closed.

It is necessary that an agitator of some form shall be employed to keep the powder in circulation above the partition and break any lumps that may be therein. To that end an agitator is located above said partition. The agitator is shaped, preferably, in like manner as the slide or damper 19 and is designated in the drawings as 25, and its wings are usually provided with openings 26, created, ordinarily, in a similar manner to the apertures upon a grater, and above the agitator a spider 27 is located, which serves to cut or break the mass of powder before it reaches the agitator. The agitator is revolved when the bellows is worked through the medium of a shaft 28, which shaft is journaled in the bottom of the receptacle and extends through the damper or slide to the partition 16, it being attached at its upper end to the agitator. The lower end of the shaft is provided with a crank-arm 29, and this crank-arm is connected by a link 30 to the movable side of the bellows. A nozzle 31, through which the material is to be forced, is connected with the receptacle at or near the lower end thereof and is located at an angle to the opening 13 of the bellows. The nozzle is carried along the fixed side of the bellows, being secured to its neck by a strap or equivalent device, and said nozzle extends any desired distance beyond the neck of the bellows, and in order that the powder forced through the nozzle may be deflected and deposited upon the backs of the leaves of the plants to be operated upon an extension-nozzle 32 is slid over the nozzle proper, and at the end opening of this auxiliary nozzle a deflecting-plate 33 is located, standing upright in front of the outlet-opening of the said auxiliary nozzle and a slight distance therefrom, the deflecting-plate 33 being preferably a portion of the auxiliary nozzle.

In the operation of the device by working the bellows the powder contained in the receptacle is blown out in fine particles through the nozzle 31 and out through the auxiliary nozzle 32 when said nozzle is used, and while the device is in use the movement of the bellows will cause the agitator to constantly revolve.

Having thus described my invention, I claim as new and desire to secure by Letters Patent—

In a device for distributing fungus or insecticide powder, the combination, with a bellows, a receptacle attached to the fixed side of the bellows, a communication being established between the receptacle and the interior of the bellows, and a nozzle projecting from the lower end of the receptacle beyond the bellows, of a partition located in the receptacle above its connection with the nozzle, said partition being provided with a series of apertures arranged in groups, a slide or damper consisting of a hub and a series of wings, the latter being adapted to be carried beneath the apertures in the partition and close them or partially close them, as desired, a scale located upon the outer face of the receptacle, a pointer carried by the slide or damper, an agitator held to revolve over the apertured partition, the said agitator consisting of a hub and a series of wings radiating therefrom, the wings having a grater-like surface, a spider fixedly secured above the agitator, a shaft connected with the agitator and extending down through the damper or slide, the apertured partition, and the bottom of the receptacle, a crank-arm formed at the lower end of the shaft, and a link connection between the crank-arm and the movable portion of the bellows, as and for the purpose set forth.

CHRISTIAN H. JOOSTEN.

Witnesses:
J. FRED. ACKER,
E. M. CLARK.